US012164320B2

(12) United States Patent
Chang et al.

(10) Patent No.: US 12,164,320 B2
(45) **Date of Patent: *Dec. 10, 2024**

(54) REFERENCE VOLTAGE GENERATION

(71) Applicant: Taiwan Semiconductor Manufacturing Company, Ltd., Hsinchu (TW)

(72) Inventors: Yen-An Chang, Miaoli County (TW); Yi-Chun Shih, Taipei (TW); Chieh-Pu Lo, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 350 days.

This patent is subject to a terminal disclaimer.

(21) Appl. No.: 17/682,169

(22) Filed: Feb. 28, 2022

(65) Prior Publication Data

US 2022/0179439 A1 Jun. 9, 2022

Related U.S. Application Data

(63) Continuation of application No. 16/858,087, filed on Apr. 24, 2020, now Pat. No. 11,262,778.

(60) Provisional application No. 62/868,344, filed on Jun. 28, 2019.

(51) Int. Cl.
*G05F 1/575* (2006.01)
*G05F 1/59* (2006.01)

(52) U.S. Cl.
CPC ................ *G05F 1/575* (2013.01); *G05F 1/59* (2013.01)

(58) Field of Classification Search
CPC ... G05F 1/575; G05F 1/12; G05F 1/59; G05F 1/595; G05F 1/56; G05F 1/613; G05F 1/614; G05F 1/618
See application file for complete search history.

(56) References Cited

U.S. PATENT DOCUMENTS

| | | | |
|---|---|---|---|
| 8,981,750 B1 | 3/2015 | Meher et al. | |
| 9,479,180 B2 | 10/2016 | Bellitra et al. | |
| 9,525,344 B2 | 12/2016 | Chen | |
| 9,575,500 B2 | 2/2017 | Kronmueller et al. | |
| 9,594,387 B2 | 3/2017 | Gakhar et al. | |
| 9,710,003 B2 | 7/2017 | El-Nozahi et al. | |
| 11,262,778 B2 * | 3/2022 | Chang | G05F 1/59 |
| 2006/0038609 A1 | 2/2006 | Oddone et al. | |
| 2006/0132225 A1 | 6/2006 | Naka et al. | |
| 2010/0253299 A1 | 10/2010 | Kim et al. | |
| 2014/0117952 A1 | 5/2014 | Li | |
| 2019/0033902 A1 | 1/2019 | Enjalbert et al. | |

* cited by examiner

*Primary Examiner* — Hai L Nguyen
(74) *Attorney, Agent, or Firm* — Merchant & Gould P.C.

(57) ABSTRACT

A reference voltage generator includes an input terminal configured to receive an enable signal and an output terminal configured to provide an output signal. A voltage generator circuit is arranged to generate a first output voltage signal, and a pre-settling circuit is arranged to generate a second output voltage. The pre-settling circuit is configured to provide the second output voltage signal at the output terminal in response to the enable signal received at the input terminal, and following a first time period provide the first output voltage at the output terminal.

20 Claims, 4 Drawing Sheets

REFERENCE VOLTAGE GENERATION

RELATED APPLICATION

This application is a continuation of application Ser. No. 16/858,087, filed on Apr. 24, 2020, now U.S. Pat. No. 11,262,778 B2, issued on Mar. 21, 2022, which claims the benefit of U.S. Provisional Application No. 62/868,344, filed on Jun. 28, 2019 and entitled "Reference Voltage Generation," the contents of which are incorporated by reference herein in their entirety, as if set forth fully herein.

BACKGROUND

Improvements in integration density of semiconductor devices results in shrinking dimensions of such devices. This may require increased performance with a desire for reduced power consumption. Reference voltage generators, such as band gap reference circuits (BGR), and voltage regulators, such as low-dropout (LDO) regulators, often are used in such shrinking semiconductor devices. For instance, an LDO is typically used to provide a well-specified and stable direct-current (DC) voltage. Generally, a LDO regulator is characterized by its low dropout voltage, which refers to a small difference between respective input voltage and output voltage.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
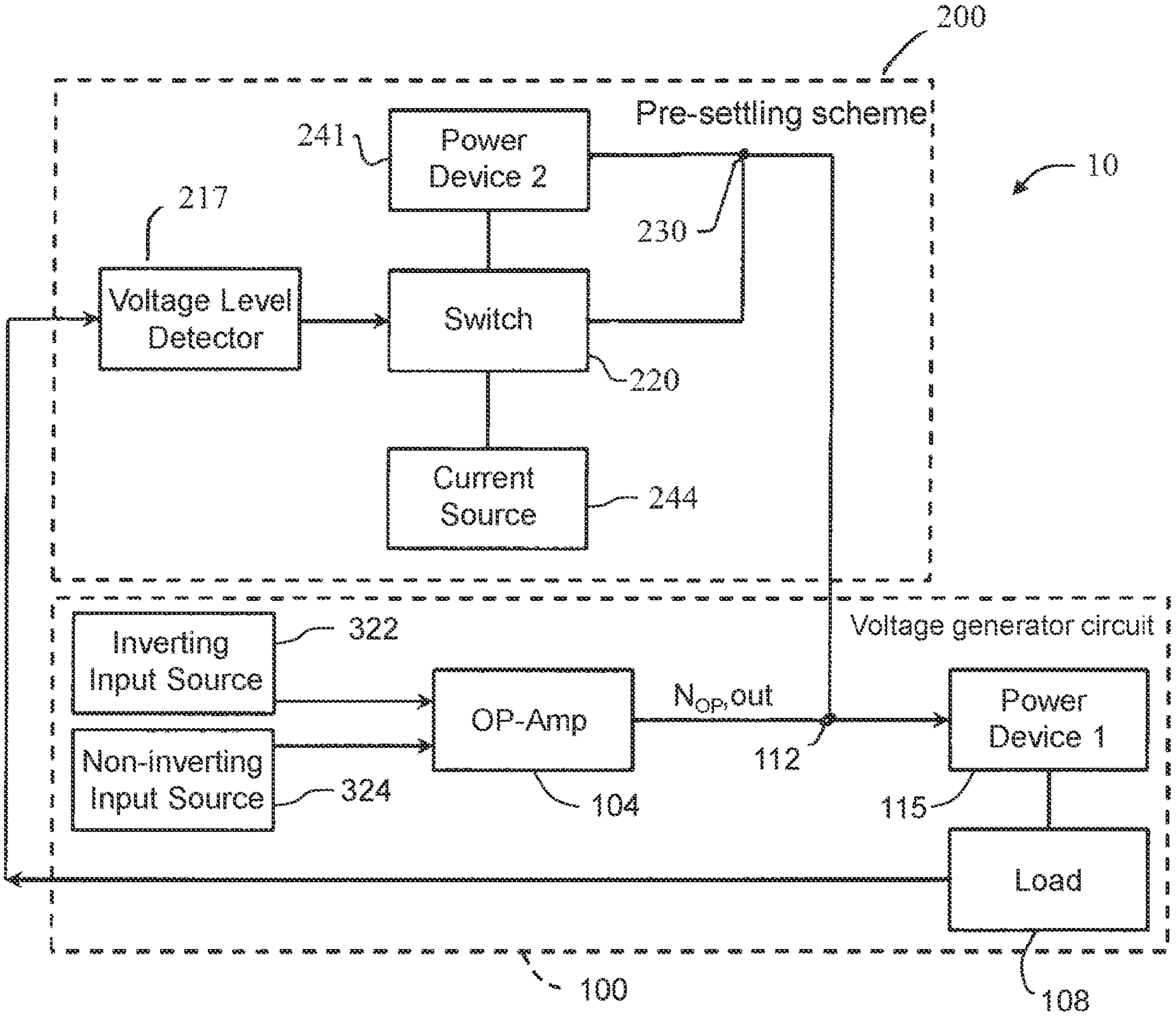
FIG. 1 is a block diagram illustrating an example voltage regulator system in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Reference voltage generators, such as band gap reference circuits (BGR), and voltage regulators, such as low-dropout (LDO) regulators, often are used in such shrinking semiconductor devices. For instance, an LDO is typically used to provide a well-specified and stable direct-current (DC) voltage. Generally, a LDO regulator is characterized by its low dropout voltage, which refers to a small difference between respective input voltage and output voltage. For convenience, the term "voltage generator" is used herein to refer broadly to any of the foregoing types of devices, whether a voltage generator or regulator. Thus, the term "voltage generator" is used herein to refer broadly to a voltage generator or a voltage regulator.

During chip power up, reference voltage generator wakeup speed is dependent on an operational amplifier (OP-amp) output settling time. With some known reference generator devices, when an enable signal for the device transitions from a logical low value to a logical high value, an OP-amp output signal will generate and fall to a target operational level slowly because of a heavy RC load, and a feedback voltage (VFB) will rise to a target level slowly. This may result in a long power up time and induce extra power consumption for chip usage.

In accordance with some example aspects of the present disclosure, an OP-amp output pre-settling scheme is disclosed for voltage generator circuits such as BGRs, voltage reference circuits for multiple internal voltage requirements, voltage down converters or regulators (e.g., LDOs) for low power memory, etc. In some examples, settling time for voltage reference or regulator circuits may be shortened. Further, internal biases overshoot and stress loading devices issues may be addressed.

In accordance with some disclosed example embodiments disclosed herein, when a chip is powered up, a pre-settling circuit according to an example aspect herein is operable to pre-settle an OP-amp output to one threshold drop from power before stabilization. The pre-settling circuit is active upon chip power-up. A self-control scheme may be included for power saving and stability. The pre-settling circuit can be turned off after internal voltages reach a target level by self-detection. This may shorten chip analog internal voltage wake-up time. The fast settling behavior may save extra power consumption for chip(s) used in a System-On-Chip (SOC) power up sequence.

FIG. 1 is a block diagram illustrating an example of a voltage regulator system 10 in accordance with aspects of the present disclosure. The voltage regulator 10 includes a voltage generator circuit 100 and a pre-settling scheme or circuit 200.

The pre-settling circuit 200 comprises a voltage level detector 217 that detects a voltage of a load 108 of the voltage generator circuit 100, and provides the detected voltage level to a switch 220 that has a current source 244 and which is supplied power from a power device ("Power Device 2") 241. An output from the switch 220 and an output from the power device 241 are both coupled to a node 230 of the pre-settling circuit 200 and to a node 112 of the voltage generator circuit 100.

The voltage generator circuit 100 comprises an operational amplifier 104 having a non-inverting input source 322 and an inverting input source 324, wherein the operational amplifier 104 can generate a signal (also referred to as a "voltage") $N_{OP}$,out at an output node 112 of the operational amplifier 104. A power device ("Power Device 1") 115 has an input that is coupled to the output of the operational amplifier 104 by way of node 112. An output of the power device 115 has the above-mentioned load 108 coupled thereto, and the voltage from that load 108 is fed back to an input of the voltage level detector 217 for detection.

The voltage generator circuit 100 is controllable by an output from the pre-settling circuit 200 (e.g., an output from power device 241) to cause voltage $N_{OP}$,out to settle to a predetermined voltage level more rapidly than would be the case if no pre-settling circuit 200 were employed. The manner in which the pre-settling circuit 200 and the voltage generator circuit 100 operate will be further discussed below.

Figure 2:
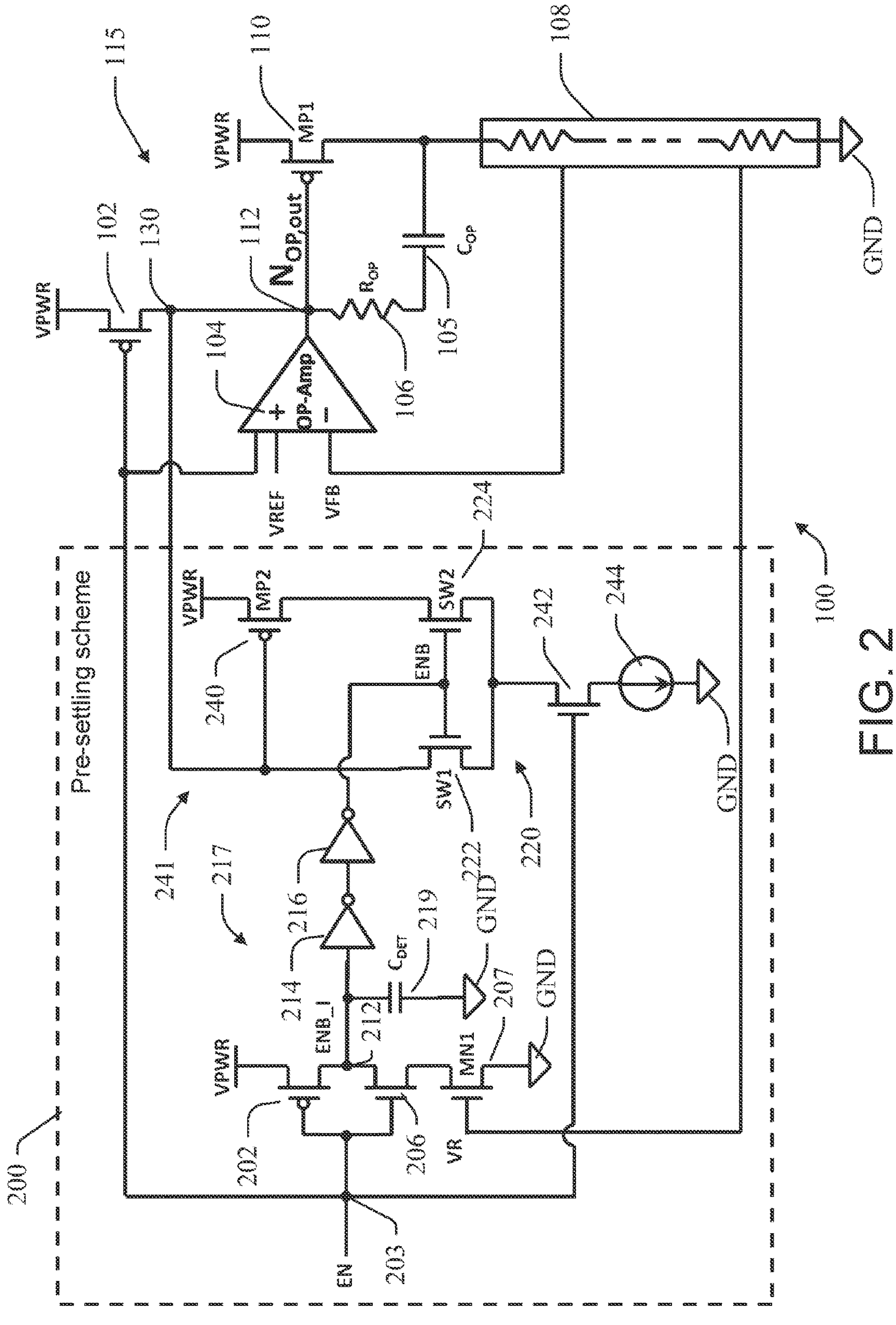
FIG. 2 is a circuit diagram illustrating an example of the voltage regulator system of FIG. 1 in accordance with some embodiments.

Referring now to FIG. 2, a circuit diagram is shown that illustrates an example of the pre-settling circuit 200 and the voltage generator circuit 100 that form the voltage regulator 10, according to an example embodiment herein. The voltage generator circuit 100 may form, in a non-limiting example, a BGR circuit or a LDO circuit.

The voltage generator circuit 100 includes a node 130 that is coupled to an output of the pre-settling circuit 200. The illustrated voltage generator circuit 100 further includes a PMOS transistor 102, operational amplifier 104, a resistor 106, a capacitor 105, a PMOS transistor 110, and a load 108 coupled to a ground terminal GND.

The operational amplifier 104 has an enable input terminal for receiving an enable signal EN, a non-inverting input terminal for receiving a reference voltage VREF, and an inverting input terminal for receiving a feedback voltage VFB from the load 108. An output terminal of the operational amplifier 104 provides the output signal $N_{OP}$,out at a node 112. The operational amplifier 104 generally operates, when enabled, by determining a difference between the voltages applied to the inverting and non-inverting inputs, and amplifying the difference by a gain.

The PMOS transistor 102 has a gate terminal connected to receive the enable signal EN, a source/drain terminal coupled to a voltage terminal that supplies power voltage VPWR, and a source/drain terminal coupled to the node 130. The resistor 106 is coupled between the node 112 and the capacitor 105, which is coupled between the resistor 106 and the load 108.

The PMOS transistor 110 has a gate terminal coupled to the node 112, a source/drain terminal coupled to the VPWR terminal, and a source/drain terminal coupled to the load. In the illustrated example, the PMOS transistors 102 and 110, the resistor 106, and the capacitor 105 form the power device 115 shown in FIG. 1.

The pre-settling circuit 200 includes an enable terminal 203 configured to receive the enable signal EN. A PMOS transistor 202 has a gate terminal coupled to receive the enable signal EN, a source/drain to the VPWR terminal, and a source/drain terminal coupled to a node 212. An NMOS transistor 206 has a gate terminal coupled to receive the enable signal EN, a source/drain terminal coupled to the node 212, and a source/drain terminal coupled to a source/drain terminal of an NMOS transistor 207. The gate terminal of the transistor 207 receives the reference voltage VR fed back from the load 108 of the voltage generator circuit 100. One source/drain terminal of the transistor 207 is coupled to the NMOS transistor 206, and the other source/drain terminal of the transistor 207 is coupled to the ground terminal GND.

The transistors 202 and 206 provide an initial enable signal ENB-I at the node 212, which is received by inverters 214 and 216. The inverters 214 and 216 function as delay elements, providing the delayed signal ENB-I as a second enable signal ENB to an input of the switch 220. The switch 220 includes first and second NMOS switch transistors 222, 224, which are discussed further below. The pre-settling circuit 200 also includes a capacitor 219 having a first terminal coupled to the node 212 and a second terminal coupled to ground GND. In the illustrated embodiment, transistors 202, 206, and 207, capacitor 219, and inverters 214 and 216 form the voltage level detector 217 shown in FIG. 1.

The pre-settling circuit 200 also includes a PMOS transistor 240, having its gate terminal coupled to the node 130, a source/drain terminal coupled to the voltage source VPWR, and a source/drain terminal coupled to a source/drain terminal of the second switch transistor 224. In one example embodiment herein, the PMOS transistor 240 and the voltage terminal supplying the VPWR voltage form the power device 241 shown in FIG. 1.

As noted above, the switch 220 includes the first switch transistor 222 and the second switch transistor 224, as well as an NMOS transistor 242. The first switch transistor 222 has is gate terminal coupled to the gate terminal of the second switch transistor 224, which receive the ENB signal output by the inverter 216. A source/drain terminal of the first switch transistor 222 is coupled to the node 130, which as described above, is also coupled to the gate terminal of the PMOS transistor 240. The second source/drain terminals of the first and second switch transistors 222, 224 are both coupled to a source/drain terminal of the transistor 242. The transistor 242 further has a gate terminal coupled to the enable terminal 203 for receiving the enable signal EN, and a source/drain terminal coupled to a current source 244.

Figure 3:
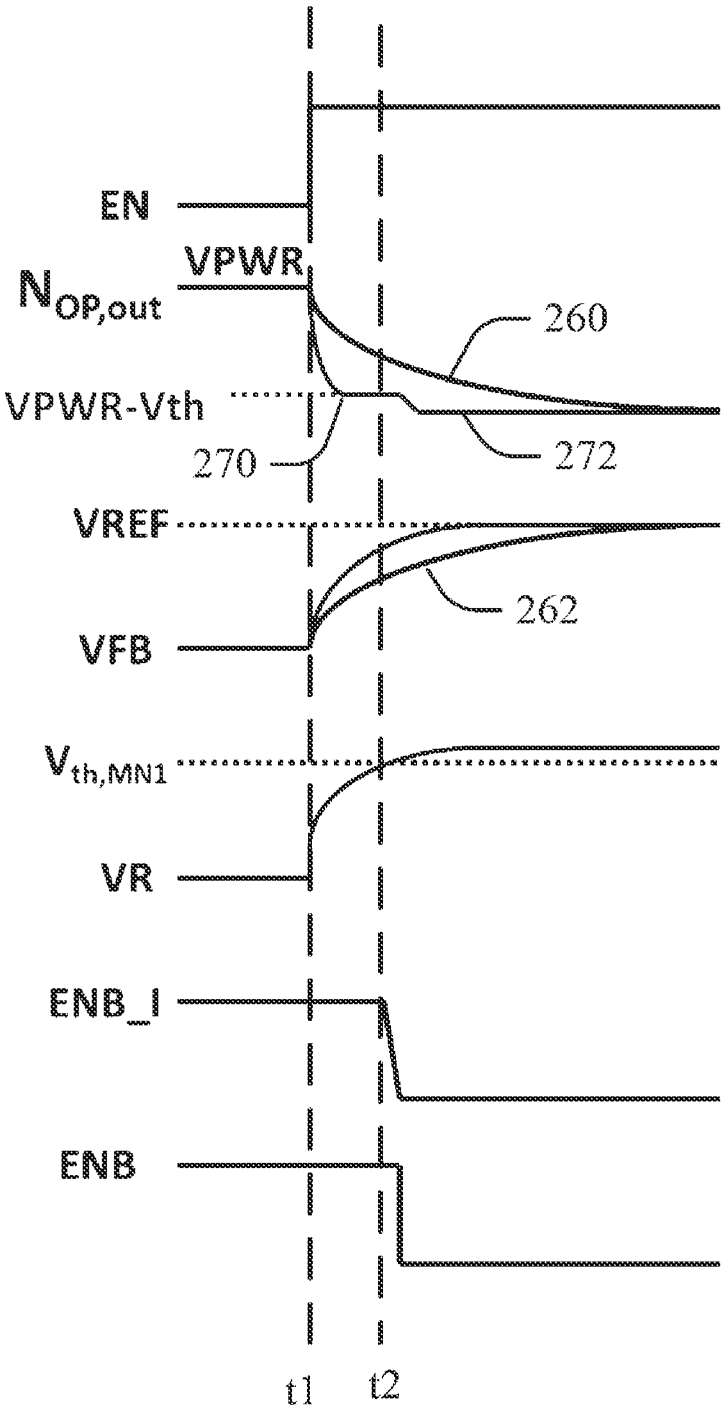
FIG. 3 is a state diagram showing various voltage level states of components of the pre-settling circuit and voltage generator circuit of FIG. 2, in accordance with some embodiments.

FIG. 3 a state diagram showing various signal level states associated with an example of the voltage regulator 10. The manner in which the pre-settling circuit 200 operates to control the circuit 100 will now be described with reference to FIGS. 2 and 3. Initially, the voltage of the enable signal EN has a logical low value, and with the enable signal EN in this state, the pre-settling circuit 200 is in a turned off state. The low EN signal turns off the operational amplifier 104 and the NMOS transistor 242, and turns on the PMOS transistor 102. The $N_{OP}$,out signal at the node 112 is thus at the level of the VPWR source voltage, which holds the PMOS transistor 110 off. The VR and VFB signals from the load 108 are both accordingly low.

Since the VR signal received by the NMOS transistor 207 is below the threshold voltage $Vth,_{MN1}$ thereof, the transistor 207 is off. The PMOS/NMOS transistor pair 202, 206 function to invert the low EN signal, resulting in the ENB_I and ENB signals being at a high state which turns on the first and second switch transistors 222, 224.

As shown in FIG. 3, the VFB signal received at the inverting input of the operational amplifier 104 is below the reference voltage. At a time t1 the EN signal transitions from low to high. This enables the operational amplifier 104. In the absence of the pre-settling circuit 200, the operational amplifier 104 would generate and fall to its target slowly due to the RC load as shown by the signal 260. The VFB signal would rise to its target slowly in the absence of the pre-settling circuit as shown by the signal 262.

The pre-settling circuit 200 functions to cause the output $N_{OP}$,out of the voltage generator circuit 100 to more quickly settle upon device power up. The high enable signal EN at time t1 turns on the NMOS transistor 206 and turns off the PMOS transistor 202, and additionally turns on the NMOS transistor 242. The VR signal begins to rise, but until it reaches the threshold voltage $Vth,_{MN1}$ of the transistor 207, it remains off, holding the ENB_I signal high, as well as the ENB signal. Thus, the switch transistors 222 and 224 of the switch 220 remain on. As noted above, the NMOS transistor 242 is also on due to the high EN signal at t1. Thus, the $N_{OP}$,out voltage will quickly settle to a level of the VPWR voltage less the threshold voltage of the switch 220, as shown by the signal 270 in FIG. 3. This is near the target voltage level indicated at 272.

When the VR signal rises above the threshold voltage $Vth,_{MN1}$ of the transistor 207 as shown at time t2 in FIG. 3, causing the ENB_I and ENB signals to go low, turning off the NMOS transistors 222 and 224 of the switch 220, thus turning off the pre-settling circuit 200. Consequently, the node $N_{OP}$,out will be regulated by the output of the operational amplifier 104.

Thus, by virtue of the pre-settling circuit 200, during chip power-up the voltage $N_{OP}$,out can be pre-settled to a threshold drop from VPWR before stabilization of the operational amplifier 104. Also, the pre-settling circuit 200 can be turned off after an internal voltage (e.g., voltage VR) reaches a target level or exceeds a threshold (e.g., $Vth,_{MN1}$) by self-detection, for example, by the voltage level detector 217 (transistor 207). This provides power saving and stability. For instance, features such as described above may shorten chip analog internal voltage wake-up time, and the fast settling behavior may save overall power consumption for chip(s) used in a System-On-Chip (SOC) power up sequence.

Figure 4:
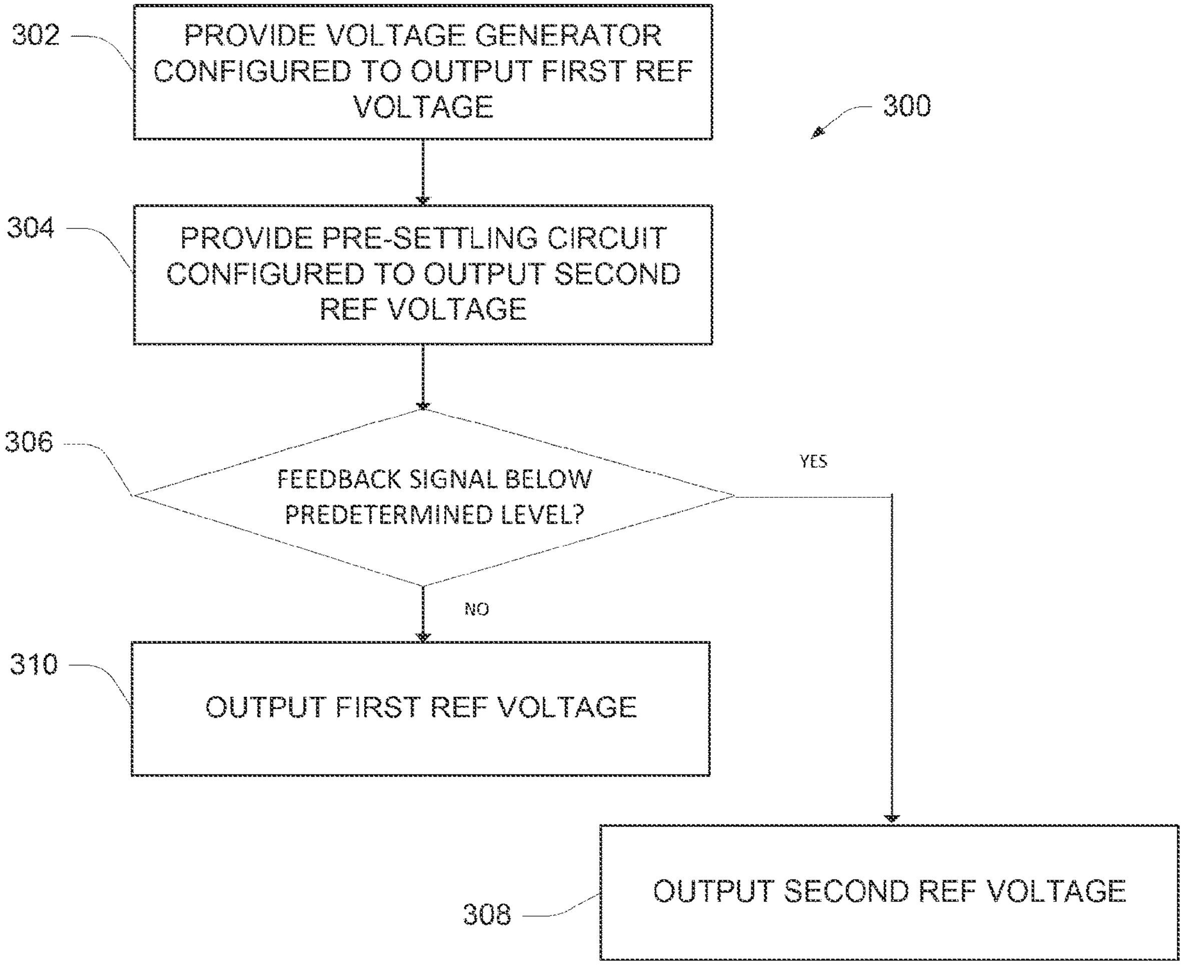
FIG. 4 is a flow diagram illustrating an example of a method for generating a reference voltage in accordance with some embodiments.

FIG. 4 illustrates an example method 300 in accordance with disclosed embodiments. In step 302, a voltage generator such as the voltage generator circuit 100 shown in FIG. 1 is provided. The voltage generator circuit 100 includes an operational amplifier 104, among other things. The operational amplifier 104 is configured to output a first reference voltage. In step 304, a pre-settling circuit such as the pre-settling circuit 200 is provided. The pre-settling circuit 200 is configured to output a second reference voltage. In decision block 306, a feedback signal, such as the feedback signal VR from the load 108 is compared to a predetermined voltage. In step 308, the second reference voltage is output from the pre-settling circuit to the load in response to the feedback signal from the load being below the predetermined voltage level. The first reference voltage is output from the voltage generator in response to the feedback signal from the load being above the predetermined voltage level in step 310.

It should be note that the types of transistors described above as being used in the pre-settling circuit 200 and voltage generator circuit 100 are exemplary in nature, and that, in other example embodiments herein, other types of transistors can be employed instead to enable the pre-settling circuit 200 to control the voltage generator circuit 100.

Disclosed embodiments thus include a reference voltage generator that includes an input terminal configured to receive an enable signal and an output terminal configured to provide an output signal. A voltage generator circuit is arranged to generate a first output voltage signal. A pre-settling circuit arranged to generate a second output voltage signal. The pre-settling circuit is configured to provide the second output voltage signal at the output terminal in response to the enable signal received at the input terminal, and following a first time period provide the first output voltage signal at the output terminal.

In accordance with further aspects, a circuit includes an input terminal configured to receive an enable signal. A voltage detector circuit is configured to receive a load feedback signal. A switch is coupled between a voltage generator output and a current source. The switch is responsive to the voltage detector circuit, to selectively couple the voltage generator output to the current source.

In accordance with still further aspects, a method includes providing a voltage generator including an operational amplifier configured to output a first reference voltage, and providing a pre-settling circuit configured to output a second reference voltage. The second reference voltage is output to a load in response to a feedback signal from the load being below a predetermined voltage level. The first reference voltage is output in response to the feedback signal from the load being above the predetermined voltage level.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A reference voltage generator, comprising:

an input terminal configured to receive an enable signal;

an output terminal configured to provide an output voltage;

a load configured to provide a first feedback signal that is responsive to the enable signal and based on the output voltage; and a pre-settling circuit coupled to the input terminal, the output terminal, and the load and configured to generate a pre-settling output voltage at the output terminal in response to the enable signal received at the input terminal, and to discontinue providing the pre-settling output voltage at the output terminal following a first time period.

2. The reference voltage generator of claim 1, comprising a voltage generator circuit that is coupled to the output terminal and configured to generate a voltage generator output voltage at the output terminal in response to the enable signal.

3. The reference voltage generator of claim 2, wherein the voltage generator circuit includes an operational amplifier having an output coupled to the output terminal and a first input connected to the input terminal, a second input connected to receive a reference voltage, and a third input configured to receive a second feedback signal from the load, wherein the operational amplifier is configured to provide the voltage generator output voltage.

4. The reference voltage generator of claim 2, wherein the voltage generator output voltage settles over time to a first predetermined voltage level, and the pre-settling output voltage settles over time to a second predetermined voltage level, wherein the pre-settling circuit is configured so that the pre-settling output voltage settles to the second predetermined voltage level more rapidly than the voltage generator output voltage settles to the first predetermined voltage level.

5. The reference voltage generator of claim 1, wherein the pre-settling circuit comprises a switch coupled to the output terminal and a current source, wherein the switch is responsive to the enable signal to selectively couple the output terminal to the current source based on the first feedback signal and to generate the pre-settling output voltage of the pre-settling circuit when the switch is in a turned-on state.

6. The reference voltage generator of claim 5, wherein the switch is responsive to the enable signal.

7. The reference voltage generator of claim 5, wherein the current source is coupled between the switch and a ground terminal.

8. The reference voltage generator of claim 5, wherein the switch is coupled to the input terminal via a plurality of inverters.

9. The reference voltage generator of claim 8, wherein the switch comprises first and second transistors, each having a gate terminal coupled to the plurality of inverters.

10. The reference voltage generator of claim 9, wherein the switch comprises a third transistor coupled between the first and second transistors and the current source and having a gate terminal coupled to the input terminal.

11. The reference voltage generator of claim 1, wherein the pre-settling circuit comprises a voltage level detector circuit coupled to the input terminal and configured to receive the first feedback signal and compare the first feedback signal to a predetermined voltage.

12. The reference voltage generator of claim 11, wherein the voltage level detector circuit comprises a transistor coupled to receive the first feedback signal, and wherein the predetermined voltage is a threshold voltage of the transistor.

13. A circuit, comprising:

an input terminal configured to receive an enable signal;

an output terminal configured to provide an output voltage;

a voltage detector circuit coupled to the input terminal and configured to receive a load feedback signal that is responsive to the enable signal and based on the output voltage; and a switch coupled to the voltage detector circuit and a current source, wherein the switch is responsive to the voltage detector circuit to selectively couple the output terminal to the current source based on the load feedback signal received by the voltage detector circuit, wherein the switch includes:

a first transistor having a first source/drain terminal coupled to the output terminal and a gate terminal configured to respond to the voltage detector circuit;

a second transistor having a first source/drain terminal coupled to a power device and a gate terminal configured to respond to the voltage detector circuit; and a third transistor coupled in series between a second source/drain terminal of each of the first and second transistors and the current source and having a gate terminal coupled to the input terminal.

14. The circuit of claim 13, wherein the voltage detector circuit comprises:

a PMOS transistor having a first source/drain terminal coupled to a power supply terminal, and a gate terminal coupled to the input terminal;

a first NMOS transistor having a first source/drain terminal coupled to a second source/drain terminal of the PMOS transistor, and a gate terminal coupled to the input terminal;

a second NMOS transistor having a first source/drain terminal coupled to a second source/drain terminal of the first NMOS transistor, and a second source/drain terminal coupled to a ground terminal, and a gate terminal coupled to receive the load feedback signal; and a capacitor coupled between the first source/drain terminal of the first NMOS transistor and the ground terminal.

15. The circuit of claim 13, wherein the gate terminal of the first transistor and the gate terminal of the second transistor are coupled to the first source/drain terminal of the first NMOS transistor and the second source/drain terminal of the PMOS transistor via a plurality of inverters.

16. The circuit of claim 15, wherein the plurality of inverters include a first inverter and a second inverter coupled in series between the first source/drain terminal of the first NMOS transistor and the gate terminals of the first transistor and the second transistor.

17. A method, comprising:

enabling a pre-settling circuit to output a pre-settling voltage to an output node;

comparing a feedback signal from a load coupled to the output node to a predetermined voltage level by the pre-settling circuit;

outputting the pre-settling voltage to the output node from the pre-settling circuit in response to the feedback signal from the load being below the predetermined voltage level; and discontinuing the outputting of the pre-settling voltage to the output node from the pre-settling circuit in response to the feedback signal from the load being above the predetermined voltage level.

18. The method of claim 17, comprising outputting the pre-settling voltage in response to an enable signal received by the pre-settling circuit.

19. The method of claim 18, wherein outputting the pre-settling voltage in response to the enable signal includes activating a switch in response to the enable signal.

20. The method of claim 17, wherein comparing the feedback signal from the load to the predetermined level comprises providing the feedback signal from the load to a gate of a transistor of the pre-settling circuit, and outputting the pre-settling voltage in response to the feedback signal being below a threshold voltage of the transistor.

* * * * *